United States Patent [19]

Divivier et al.

[11] Patent Number: 5,680,564
[45] Date of Patent: Oct. 21, 1997

[54] PIPELINED PROCESSOR WITH TWO TIER PREFETCH BUFFER STRUCTURE AND METHOD WITH BYPASS

[75] Inventors: Robert James Divivier; Mario Nemirovsky, both of San Jose, Calif.

[73] Assignee: National Semiconductor Corporation, Santa Clara, Calif.

[21] Appl. No.: 445,569

[22] Filed: May 26, 1995

[51] Int. Cl.$^6$ ...................................................... G06F 9/38
[52] U.S. Cl. ........................... 395/381; 395/383; 395/380; 395/464
[58] Field of Search ..................................... 395/250, 375, 395/800, 464, 467, 380, 381, 382, 383, 384, 386, 388, 389

[56] References Cited

U.S. PATENT DOCUMENTS

| | | | |
|---|---|---|---|
| 4,992,932 | 2/1991 | Ohshima | 395/584 |
| 5,179,662 | 1/1993 | Corrigan et al. | 395/250 |
| 5,189,319 | 2/1993 | Fung et al. | 326/86 |
| 5,204,953 | 4/1993 | Dixit | 395/421.1 |
| 5,254,888 | 10/1993 | Lee et al. | 327/298 |
| 5,259,006 | 11/1993 | Price et al. | 375/356 |
| 5,327,547 | 7/1994 | Stiles et al. | 395/464 |
| 5,361,391 | 11/1994 | Westberg | 395/464 |
| 5,404,473 | 4/1995 | Papworth et al. | 395/588 |
| 5,408,626 | 4/1995 | Dixit | 395/421.1 |
| 5,442,756 | 8/1995 | Grochowski et al. | 395/585 |

FOREIGN PATENT DOCUMENTS 0380854  8/1990  European Pat. Off. .

OTHER PUBLICATIONS

Serra, Micaela & Dervisoglu, Bulent I, "Testing", Chapter 79, *The Electrical Engineering Handbook*, Richard C. Dorf, Editor–in–Chief, pp. 1808–1837, CRC Press.

L-T Wang et al., "Feedback Shift Registers For Self-Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp.210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80x86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A–4, 8237A–5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

(List continued on next page.)

*Primary Examiner*—Parshotam S. Lall
*Assistant Examiner*—Viet Vu
*Attorney, Agent, or Firm*—Limbach & Limbach L.L.P.

[57] ABSTRACT

A method and apparatus for prefetching instructions in a pipelined processor including first and second prefetch buffers arranged in a two tier system. As instruction bytes are fetched from cache memory or external memory, those instruction bytes from memory for which there is space in the first level buffer are loaded therein, and, simultaneously, those valid instruction bytes in the second tier buffer for which there is room in the first tier buffer are also loaded into the first tier buffer. Those instruction bytes from memory for which there is not currently room in the first tier buffer are loaded into the second tier buffer. The second tier buffer is also used as a buffer for loading the instruction cache memory from the external memory.

31 Claims, 3 Drawing Sheets

OTHER PUBLICATIONS

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation *i486 Micro Processor Hardware Reference Manual*, Processor Bus, pp. 3–28 thru 3–32.

PIPELINED PROCESSOR WITH TWO TIER PREFETCH BUFFER STRUCTURE AND METHOD WITH BYPASS

FIELD OF THE INVENTION

The invention pertains to prefetch structure and operation in a pipelined microprocessor. More particularly, the invention pertains to a two tier prefetch buffer, the second tier of which can be bypassed to improve efficient presentation of instructions for decoding.

BACKGROUND OF THE INVENTION

Modern microprocessors employ pipelining techniques which allow multiple consecutive instructions to be prefetched, decoded, and executed simultaneously in separate stages. Accordingly, in any given clock cycle, a first instruction may be executed while the next (second) instruction is simultaneously being decoded, and a third instruction is being fetched. Accordingly, since less is being done per instruction each cycle, cycle time can be made shorter. Thus, while it requires several clock cycles for a single instruction to be prefetched, decoded and executed, it is possible to have a processor completing instructions as fast as one instruction per cycle, because multiple consecutive instructions are in various stages simultaneously.

Typically, buffers for temporarily holding data are used to define the boundary between consecutive stages of the pipeline. When the pipeline advances on a cycle transition, the data is written out of that buffer into the next stage where it can be processed during that next cycle.

Most pipelined microprocessor architectures have at least four stages. In order of flow, they are (1) the prefetch stage, (2) the decode stage, (3) the execute stage, and (4) the write-back stage. In the prefetch stage, an instruction is read out of memory (e.g., an instruction cache) and stored in a buffer. In the decode stage, the processor reads an instruction out of the prefetch buffer and converts it into an internal instruction format which can be used by the execute stage of the microprocessor to perform one or more operations, such as arithmetic or logical operations. In the execute stage, the actual operations are performed. Finally, in the write-back stage, the results from the operation are written to the designated registers and/or other memory locations.

In more complex microprocessors, one or more of the these four basic stages can be further broken down into smaller stages to simplify each individual stage and even further improve instruction completion speed.

Generally, instructions are read out of memory (e.g., external memory or an instruction cache) in a sequential address order. However, instruction branches, in which the retrieval of instructions from sequential address space is disrupted, are common, occurring on average about every 4 to 9 instructions.

The hardware in an instruction prefetch stage typically comprises a prefetch buffer or prefetch queue which can hold one or more instructions. Each cycle, the decode section can take in the bytes of an instruction held in the prefetch buffer for decoding during that cycle.

Some microprocessor instruction sets are known as variable width instruction sets. In such architectures, the instructions are not all the same width. For instance, in the instruction set of the x86 microprocessors developed by Intel Corporation of Santa Clara, Calif., an instruction can be anywhere from 1 to 16 bytes in width.

It is an object of the present invention to provide an improved microprocessor.

It is a further object of the present invention to provide an efficient prefetch stage structure and method for a microprocessor with a variable width instruction set architecture.

It is another object of the present invention to provide a method and apparatus for maintaining the prefetch buffer as full as possible during each cycle.

It is yet another object of the present invention to provide a two tier prefetch buffer, the second tier of which can also be used to load an instruction cache from external memory.

SUMMARY OF THE INVENTION

The invention relates to a method and apparatus for prefetching instructions in a microprocessor, particularly a variable width instruction set architecture processor, and even more particularly an x86 architecture microprocessor. According to the invention, the prefetch stage of the microprocessor includes first and second prefetch buffers of equal width. In a preferred embodiment of the invention, the width of each buffer is great enough to hold several instructions of average width and is also equal in width to the instruction cache memory.

Each byte of the prefetch buffers has associated therewith a valid tag bit indicating whether the data contained therein is a valid instruction byte for decoding. A first one of the prefetch buffers, prefetch buffer 0, is the interface between the prefetch stage and the decode stage. It is coupled directly to the decode logic for providing instructions thereto for decoding. The second prefetch buffer, prefetch buffer 1, is a second tier in which instructions fetched from the cache or the external memory are held if there is no room in prefetch buffer 0 for them when they are retrieved.

As instructions are fetched from the cache memory or the external memory, all bytes in byte positions for which there is room in prefetch buffer 0 (i.e., which are tagged invalid in prefetch buffer 0) are loaded directly into prefetch buffer 0, bypassing prefetch buffer 1. Simultaneously, valid instruction bytes in prefetch buffer 1 which are in byte positions corresponding to byte positions in prefetch buffer 0 which are tagged invalid are loaded into prefetch buffer 0 from prefetch buffer 1. Those bytes from memory in positions for which the corresponding byte position in prefetch buffer 0 are tagged valid are loaded into prefetch buffer 1. After each fetch, the valid bits of both prefetch buffers are updated.

The flow of instruction bytes from source (external memory, instruction cache, or prefetch buffer 1) to destination (prefetch buffer 1 or prefetch buffer 0) is dictated by masks used to selectively load the data bytes into byte positions in the two prefetch buffers. One way of directing the data bytes is to use the masks to generate the clock enables for each of the prefetch buffers and the select control lines for certain multiplexers. In one such scheme, each byte of each prefetch buffer is individually controlled by a separate clock enable signal. Likewise, each byte of each multiplexer is individually controlled by a separate select control signal. The masks are generated by making a particular combination of the valid bits of the two prefetch buffers and the incoming data from cache or external memory. The setting of the valid bits of each buffer each cycle is dictated by a particular logical combination of the aforementioned masks and the previous condition of the valid tag bits of the two prefetch buffers.

DETAILED DESCRIPTION OF THE INVENTION

Figure 1:
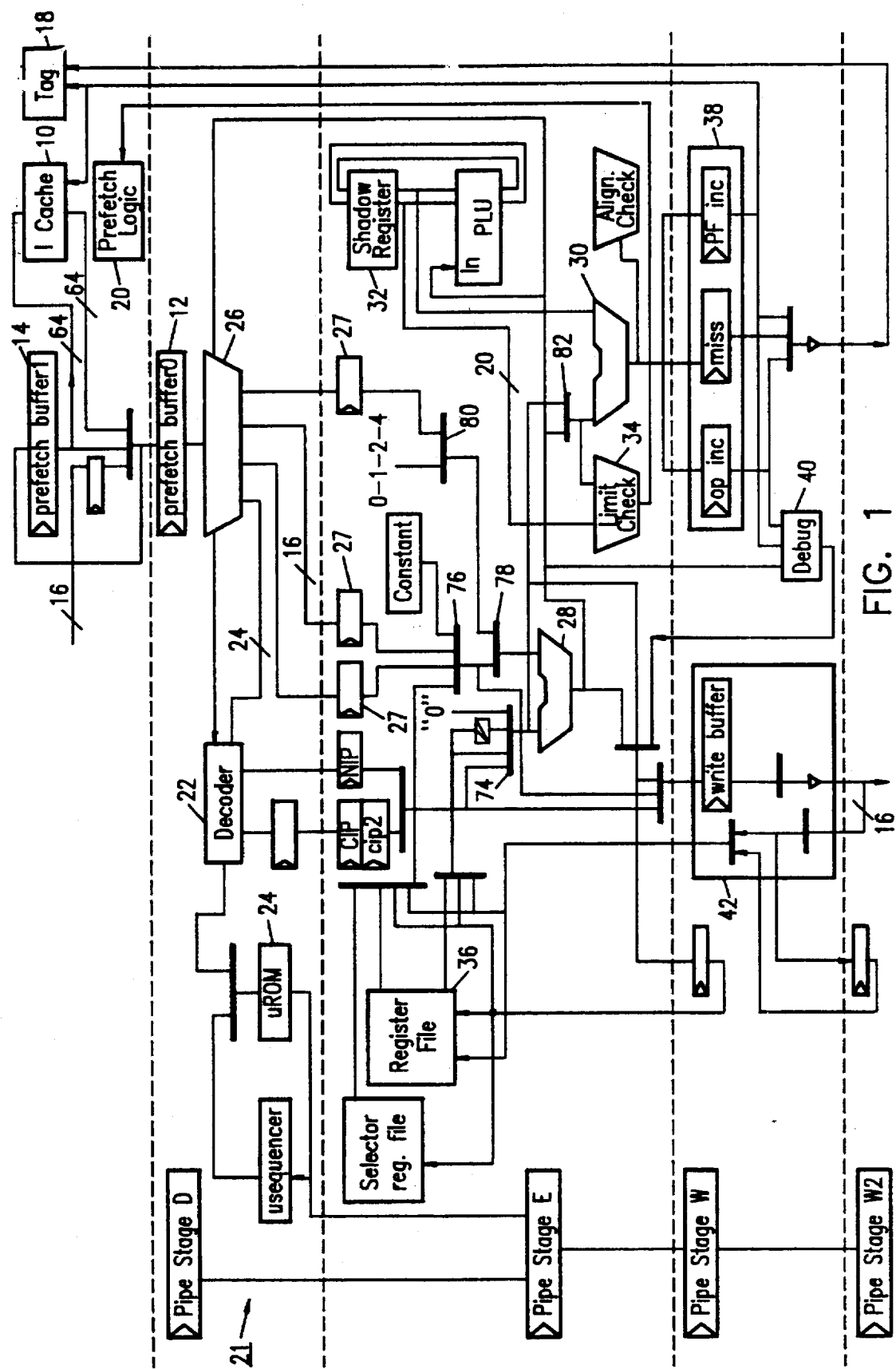
FIG. 1 is an architectural block diagram of a pipelined microprocessor according to the present invention.

The prefetch method and apparatus of the present invention is particularly designed for use in a microprocessor architecture having variable width instructions and, more particularly, a microprocessor using the instruction set of the x86 microprocessors developed by Intel Corporation of Santa Clara, Calif. FIG. 1 is a block diagram generally illustrating the various pipeline stages of a microprocessor according to a preferred embodiment of the present invention. As shown, the microprocessor is pipelined in five stages; (1) a prefetch stage, (2) a decode stage, (3) an execute stage, (4) a write-back stage, and (5) a second write-back stage.

As shown, the prefetch stage includes two prefetch buffers 12 and 14, referred to as prefetch buffer 0 and prefetch buffer 1, respectively. Prefetch buffer 0 is the boundary between the prefetch and decode stages and is the only data element in the prefetch stage which interfaces with the decode stage. The decode stage pulls instructions out of prefetch buffer 0 only. The prefetch stage also includes a 1 kilobyte instruction cache 16 and a tag memory 18 for storing tag data related to the data in the instruction cache 16. The instruction cache is direct mapped with a line size 8 bytes wide. Both prefetch buffers also are 8 bytes wide, containing byte position 0 (least significant byte position) to byte position 7 (most significant byte position). The control logic of the prefetch stage is represented by box 20 and will be described in greater detail subsequently.

The decode stage includes a data extraction unit 26 for separating the various portions of an instruction and forwarding them to the appropriate logic in the decode stage. The decode stage further includes a decoder 22 for decoding instructions and a microcode-ROM 24. The prefix and op-code portions of an instruction are sent to the decoder 22. The decoder 22 addresses a particular location in microcode-ROM 24 responsive to the op-code. Microcode-ROM 24 outputs a decoded instruction to the execute stage. Data extraction unit 26 also extracts the constant data bytes of the incoming instruction and forwards them to appropriate buffers 27 for clocking into the execute stage on the next cycle.

The execute stage fetches operands, executes the instructions and computes memory addresses. In a preferred embodiment, the microprocessor of the present invention is designed according to the x86 architecture. The x86 architecture uses a segmented address space and has several complex addressing modes. To generate a physical address according to the x86 architecture, at least two quantities must be added. Namely, the base address of the particular segment and an offset indicating the distance of the desired address from the base of the segment must be added. The offset itself may comprise up to three more parts; a base, index and displacement.

In order to keep the architecture simple and inexpensive, yet allow most addresses to be computed in a single cycle, a system is implemented in which two address additions can be performed in the same cycle. Accordingly, all addresses which have only a scaled index and a displacement or a base and a displacement can be calculated in a single cycle. The offset is calculated by a first adder 28. The offset which is output from adder 28 is added by adder 30 to the segment base address which is supplied from a shadow register 32. Segment limit checking is performed by limit check unit 34 in order to prevent overruns.

The execute stage includes a register file 36 which is used to resolve the source and destination information for all operations in the execute stage.

The write-back stage includes a bus interface unit 38, debug logic 40 and register write-back logic 42. A second write-back stage is provided for special cases and allows completion of an independent register operation out of order while a memory write access is still pending.

When fetching instructions for decoding, consecutive instructions to be decoded are not always found in consecutive address locations in memory. The most common situation in which instructions are retrieved from non-consecutive memory locations is when a branch occurs in program flow. When a branch occurs, it may take several cycles before an address can be generated, provided to memory and the data retrieved. Accordingly, it is not always possible to fetch instructions and provide them to the prefetch 0 buffer quickly enough so that the decode logic always has a waiting instruction to decode each cycle. In fact, fetching of instructions from external memory as opposed to from cache memory usually requires several cycles and may cause the decode section to stall. Such stall time slows the overall performance of the microprocessor. Accordingly, it is desirable to keep the instruction buffer in the prefetch stage as full as possible with instructions. Therefore, when a branch or other event (such as an instruction fetch from external memory) occurs which requires an extended amount of time to fetch an instruction, the decoder can continue to pull instructions out of the prefetch buffer.

Figure 2:
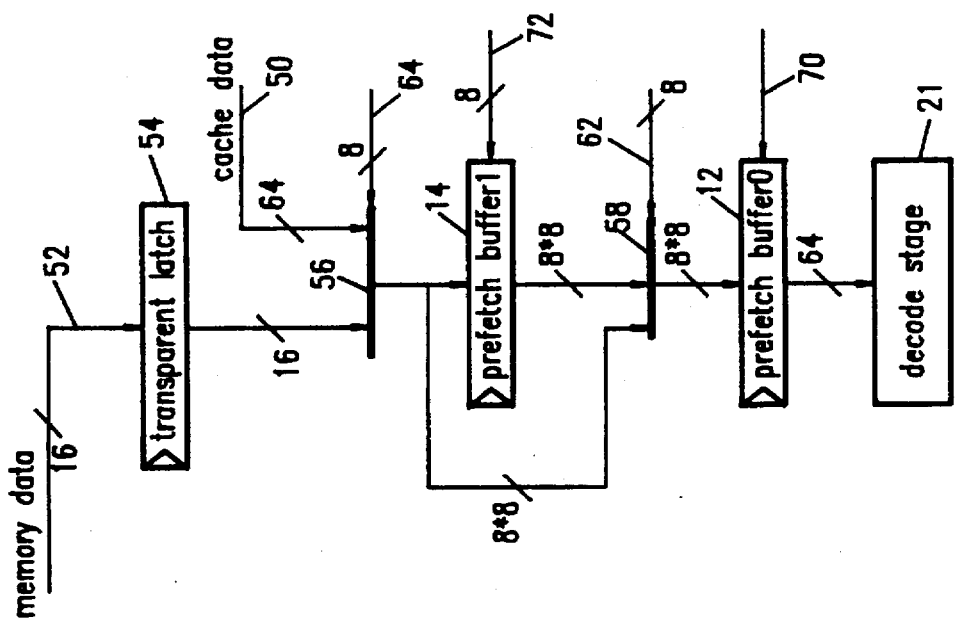
FIG. 2 is a block diagram showing a logical implementation of a prefetch stage of a microprocessor according to a preferred embodiment of the present invention.

The present invention utilizes the two tier prefetch buffer architecture illustrated in FIG. 2 in order to keep the prefetch buffers as full as possible. FIG. 2 shows a logical implementation of the prefetch stage according to the present invention.

As previously noted, the microprocessor of a preferred embodiment of the invention has a 1 kilobyte instruction cache. Accordingly, instructions can be prefetched from the instruction cache 16 over cache data lines 50 or from an external memory (not shown) over lines 52. There are 2 prefetch buffers, prefetch buffer 0, labelled with reference numeral 12 in the figures, and prefetch buffer 1, labelled with reference numeral 14 in the figures. For reasons of efficiency, it is preferred that the data cache and prefetch buffers have the same width. Thus, an entire cache line can be transferred to the prefetch stage in a single cycle. In this particular embodiment, that width is 8 bytes (or 64 bits). The external memory, on the other hand, is 2 bytes (or 16 bits) wide. Instructions from memory are loaded into a transparent latch 54 before being forwarded to the actual prefetch buffers. Prefetch buffer 1 also doubles as a buffer for loading the instruction cache memory from the external memory. Particularly, as data is loaded into prefetch buffer 1, it is separately tagged for possible loading into the cache irrespective of the condition of the valid tag bits. When a complete line of data which can be loaded into the cache memory is in prefetch buffer 1, it is written into the cache at an appropriate address and the tags are updated.

The ×86 architecture utilizes variable width instructions. Particularly, an instruction may be anywhere from 1 to 16 bytes wide with the average instruction being between 2 and 3 bytes wide. The decode stage can take in no more than 8 bytes per cycle since that is the width of prefetch buffer 0 from which it obtains the instructions to be decoded. Accordingly, instructions which are greater than 8 bytes wide require at least 2 cycles to be loaded into the decode stage and decoded. The 8 byte width for the prefetch buffers and the instruction cache is preferred because it achieves a significant reduction in semiconductor area as compared to prior art architectures in which the prefetch buffer (or queue) is the same width as the maximum possible instruction width or wider. However, it is wide enough so that the vast majority of instructions (which average 2 to 3 bytes in width) do fit within one line and potentially can be loaded into the decode stage and decoded in a single cycle. When data is accessed from the cache memory, it is accessed in 8 byte wide units. Data is input to the prefetch stage either from the cache memory or from the external memory, but not both, in any given cycle. The byte position in the prefetch buffers into which an instruction byte will be loaded is dictated by the address of the byte. Particularly, the 3 LSBs of the instruction byte's address dictate the byte position in the 8 byte wide prefetch buffers into which the byte will be loaded. Loading instruction bytes into the prefetch stage in this manner substantially simplifies circuitry throughout the processor. Associated with each byte of prefetch buffer 0 and prefetch buffer 1 is a valid tag bit. Each valid tag bit indicates whether the byte in the corresponding position of the corresponding prefetch buffer is a valid instruction byte to be decoded by the decode stage (1=valid, 0=invalid). In one preferred embodiment of the invention, the prefetch buffers 0 and 1 contain 8 extra bits for storing the valid tag bits (a total width of 72 bits).

In order to keep prefetch buffer 0 as full as possible so that it will not be depleted of instructions by the decode stage during extended waiting periods for retrieved instructions from memory, each cycle, instructions can be loaded into prefetch buffer 0 simultaneously from prefetch buffer 1 and from memory. As instructions are fetched from the cache memory or the external memory, all bytes in byte positions for which there is room in prefetch buffer 0 (i.e., which are tagged invalid in prefetch buffer 0) are loaded directly into prefetch buffer 0, bypassing prefetch buffer 1. Simultaneously, valid instruction bytes in prefetch buffer 1 which are in byte positions corresponding to byte positions in prefetch buffer 0 which are tagged invalid are loaded into prefetch buffer 0 from prefetch buffer 1. Those bytes from memory in positions for which the corresponding byte position in prefetch buffer 0 are tagged valid are loaded into that same byte position in prefetch buffer 1. After each fetch, the valid bits of both prefetch buffers are updated.

The flow of instruction bytes from source (external memory, instruction cache, or prefetch buffer 1) to destination (prefetch buffer 1 or prefetch buffer 0) may be controlled by masks used to selectively load the data bytes into byte positions in the two prefetch buffers.

FIG. 2 illustrates one way of directing the data bytes to the appropriate prefetch buffer using masks to generate select control signals for certain multiplexers and clock enable signals for prefetch buffer 0 and prefetch buffer 1 such that only the appropriate bytes from memory and prefetch buffer 1 are loaded into prefetch buffer 0. Any instruction bytes returned from memory which do not fit into prefetch buffer 0 (because the corresponding byte location in prefetch buffer 0 is still occupied by valid data) are loaded into prefetch buffer 1.

In this embodiment, the prefetch stage includes multiplexers 56 and 58, the outputs of which load prefetch buffer 1 and prefetch buffer 0, respectively. The multiplexer select control signals 64 and 62, respectively, and prefetch buffer clock enable signals 72 and 70, respectively, for controlling the bytes which are loaded into prefetch buffer 0 and prefetch buffer 1 are dictated by a logical combination of (1) the valid tag bits of the two prefetch buffers, (2) an 8 bit valid byte mask, MEM, corresponding to the data incoming from memory, and (3) an 8 bit RESET mask which indicates which bytes that were in prefetch buffer 0 at the beginning of the cycle were consumed by the decode stage during the cycle.

As shown in FIG. 2, prefetch buffer 0 is loaded through 2:1 multiplexer 58. Multiplexer 58 has eight select control lines 62. There is one control line for each 8 bit wide byte of incoming data. The select control lines 62 select either the first or second input to multiplexer 58 for transmission through the device. As shown, the two selectable inputs to multiplexer 58 are (1) the 8 output bytes from prefetch buffer 1 and (2) the 8 output bytes of multiplexer 56. The outputs of prefetch buffer 1 on lines 66 comprise the 8 bytes of data currently stored in prefetch buffer 1. The 8 byte output 68 from multiplexer 56 contains the data returned from memory (cache or external memory) during this cycle. As will be described in more detail later, if the returned data is not the result of a branch, this will either be 8 bytes of data from a cache hit or 2 bytes of data from external memory positioned in byte positions 0 and 1, 2 and 3, 4 and 5, or 6 and 7. If the data is the result of a branch, then the valid data can be in a variety of configurations, also as will be discussed in greater detail below.

Accordingly, what is loaded into prefetch buffer 0 in a given cycle is dictated by the select control signals 62 for multiplexer 58 and the clock enable signals 70 for prefetch buffer 0. Prefetch buffer 0 has a separate clock enable signal for each byte. Thus, the clock enable signal 70 is 8 bits wide. Data can be loaded into a byte position in the buffer only when the corresponding clock enable signal is asserted. Basically, therefore, select control signals 62 of multiplexer 58 determine which data is presented to the inputs of prefetch buffer 0 while prefetch buffer 0 clock enable signals 70 dictate whether that data is actually loaded into prefetch buffer 0.

Turning to prefetch buffer 1, the data which is loaded into prefetch buffer 1 on any given cycle is given by the condition of the select control signals 64 of multiplexer 56 and the clock enable signals 72 of prefetch buffer 1. As was the case with multiplexer 58, multiplexer 56 also has one select control line for each of the 8 bytes of its total width. Accordingly, select control line 64 is 8 bits wide. Also, as with prefetch buffer 0, each byte of prefetch buffer 1 is individually enabled. Accordingly, clock enable line 72 for prefetch buffer 1 is 8 bits wide.

Incoming cache data on line 50 is always 8 bytes wide. However, memory data from external memory on line 52 is only 2 bytes wide. Accordingly, transparent latch 54 fans out the incoming memory data in a 1:4 fan out such that four copies of the incoming 2 bytes of data are presented to multiplexer 56 in byte positions 0–1, 2–3, 4–5, and 6–7, respectively.

Multiplexer 56 selects the cache data on lines 50, if there is a cache hit, and selects the memory data from transparent latch 54, if there is a cache miss. Accordingly, the select control lines 64 into multiplexer 56 can be any signal which indicates whether a cache hit or miss has occurred. In a preferred embodiment of the invention, a signal is generated for purposes unrelated to the present invention which indicates the number of clock cycles since the memory request which resulted in the data being supplied currently. If the data was retrieved in one clock cycle, then it must be from cache memory since data cannot be retrieved from external memory that quickly. On the other hand, if the data is being returned in a second or subsequent clock cycle since the memory request, then it must be coming from external memory since data is always returned from the cache in a single clock cycle. Accordingly, a single bit indicating whether the returned data is or is not being returned in the first clock cycle after the memory request is used as the select control inputs 64 to multiplexer 56. This bit is fanned out to all 8 select control signals of multiplexer 56. Alternately, multiplexer 56 could have a single select control input signal for controlling all 8 bytes of the multiplexer.

A memory request will not be made unless there is room in prefetch buffer 1 for the returning data. Accordingly, it is known that there is room in prefetch buffer 1 for the data output by multiplexer 56. However, if there is room in prefetch buffer 0 for any of the returning data, it will also be loaded into prefetch buffer 0. The condition of the clock enable signals 72 (hereinafter SETPF1) of prefetch buffer 1 are given by:

SETPF1=MEM & MEMREQ

In the above equation, and all equations throughout this specification, all quantities are 8 bit quantities unless otherwise indicated. Further, the symbol, &, designates a logical AND operation and the symbol, +, indicates a logical OR operation. The quantity MEM in the above equation is an 8 bit mask indicating the byte position of valid data being returned from memory. Assuming for the moment that no branch is pending when the data is retrieved then the data returned from memory will be in one of two possible forms. For example, if there is a cache hit and no branch is pending, then all 8 bits will be 1's indicating that 8 bytes of valid data are being returned (from the cache). If there was a cache miss and data is being returned from external memory, then the MEM mask will be all 0's except for two consecutive 1's in bit positions 0–1, 2–3, 4–5, or 6–7. The two bit positions within which the valid data resides depends on the address of the data retrieved.

If a branch occurred in which the destination address is in the middle of a memory line (which is 8 bytes wide in the case of a cache hit or two bytes wide in the case of data returned from external memory, the condition of the MEM mask will be different from the two conditions described above. A more detailed discussion of how the MEM mask is generated when a branch is pending and when no branch is pending is given further below.

The MEMREQ quantity is a signal which indicates whether a memory request is pending or not. It is a one bit wide signal which can be fanned out to eight lines. This signal simply assures that if a memory request is not pending, none of the data which might be present on the output of multiplexer 56 is loaded into prefetch buffer 1.

Therefore, as can be seen from the above equation, prefix buffer 1 is loaded with all valid data being returned from memory responsive to a memory request, even if some or all of that data is actually also going to be loaded into prefetch buffer 0. However, although all of the valid data returned from memory is loaded into prefetch buffer 1, the data which also can be (and will be) loaded directly into prefetch buffer 0 during that cycle will not be marked valid in prefetch buffer 1. Of course, the data which cannot be loaded into prefetch buffer 0 in that cycle will be marked valid in prefetch buffer 1. Even though invalid tagged data in prefetch buffer 1 is irrelevant to the decode stage, it is loaded as described above because prefetch buffer 1 is also used for loading the cache memory. Separate tags keep track of the data in prefetch buffer 1 for purposes of loading the cache memory. When a full line of consecutive bytes exist in prefetch buffer 1, it can be loaded to an appropriate line in the cache memory.

As previously noted and as will be described in greater detail below, during each cycle, the valid bytes in prefetch buffer 1 for which there is room in prefetch buffer 0 are written from prefetch buffer 1, through multiplexer 58, into prefetch buffer 0 simultaneously during the cycle.

The marking of the data as valid or invalid in prefetch buffer 1 is given by the equation below:

$$PF1_{v(new)} = (PF1_{v(old)}\ \&\ PF0_{v(old)}\ \&\ BRANCH\ NOT\ TAKEN) + (MEM\ \&\ PF0_{v(old)}\ \&\ BRANCH\ NOT\ TAKEN)$$

where $PF1_{v(new)}$ = the condition of the valid bits of prefetch buffer 1 at the end of the cycle $PF0_{v(old)}$ = the condition of the valid bits of prefetch buffer 0 at the beginning of the cycle, $PF1_{v(old)}$ = the condition of the valid bits of prefetch buffer 1 at the beginning of the cycle, and BRANCH NOT TAKEN = the execute stage has not taken a branch (either all ones or all zeros)

The logical equation given above is the equivalent of the following description. Whatever data that was in prefetch buffer 1 which was not loaded into prefetch buffer 0 because there was valid data at those byte positions in prefetch buffer 0 (i.e. $PF1_{v(old)}\ \&\ PF0_{v(old)}$ remains valid in prefetch buffer 1. Additionally, any data coming in from memory which cannot be loaded into prefetch buffer 0 that was valid data at those byte positions in prefetch buffer 0 (i.e., MEM & $PF0_{v(old)}$) also must be marked valid in prefetch buffer 1.

Since, when a branch is taken, all of the data in the prefetch stage will never be executed and must be flushed, the branch not taken signal is ANDed in with both ANDing functions in the equation. Accordingly, if a branch is taken, all valid bits for prefetch buffer 1 will be cleared to zero. Thus, the equation:

$$PF1_{v(new)} = (PF1_{v(old)}\ \&\ PF0_{v(old)}\ \&\ BRANCH\ NOT\ TAKEN) + (MEM\ \&\ PF1_{v(old)}\ \&\ BRANCH\ NOT\ TAKEN)$$

Turning now to prefetch buffer 0, the select control lines 70 into multiplexer 58 are the prefetch buffer 1 valid tag bits at the beginning of the cycle, i.e., $PF1_{v(old)}$. A 1 in a given valid tag bit position causes multiplexer 58 to select the data in that byte position from prefetch buffer 1, whereas a 0 causes multiplexer 58 to select the byte in that position from the output 68 of multiplexer 56. The output 68 of multiplexer 56 is the data being returned from cache or external memory.

Not all of that incoming data from memory or prefetch buffer 1, however, can be loaded into prefetch buffer 0. First, prefetch buffer 0 may have valid data which cannot be overwritten. Second, not all of the data coming from memory will be valid, particularly if the data is being returned from external memory (in which case, at best, only 2 bytes of data will be valid). Accordingly, the clock enable signals 70 into prefetch buffer 0 (hereinafter SETPF0) must be set so that only valid incoming data is loaded into only byte positions in prefetch buffer 0 which are tagged invalid. The equation below accomplishes this task.

$$SETPF0 = (PF1_{v(old)} + MEM) \& \overline{PF0_{v(old)}}$$

The above is the logical equation for describing the following conditions. Prefetch buffer 0 is loaded with those bytes from prefetch buffer 1 which are valid at the beginning of that cycle ) and any valid bytes being returned from memory (i.e., $PF1_{v(old)}$+MEM) as long as it will not overwrite any data in prefetch buffer 0 which is already marked valid at the beginning of that cycle (i.e., & $\overline{PF0_{v(old)}}$).

In order to set the new condition of the valid tag bits of prefetch buffer 0, the following equation is used.

$$PF0_{v(new)} = (PF0_{v(old)} + SETPF0) \& \overline{RESET} \& BRANCH\ NOT\ TAKEN$$

where $PF0_{v(new)}$=the condition of the valid bits of prefetch buffer 0 at the end of the cycle, and RESET=a mask indicating which bytes in prefetch buffer 0 were consumed by the decoder during the cycle.

The above logical equation describes the following conditions. The bytes which should be marked valid in prefetch buffer 0 (i.e., $PF0_{v(new)}$) are those bytes which were previously valid in prefetch buffer 0 or were just loaded in with valid data (i.e., $PF0_{v(old)}$+SETPF0), while all bytes which were consumed by the decode stage will no longer be marked valid (i.e., & $\overline{RESET}$). As was the case with the prefetch buffer 1 valid tag bits, the branch not taken signal is ANDed in such that all valid bits will be cleared to zero regardless of the incoming data when a branch is taken in the execute stage. The bits of the RESET signal are determined in the decode pipeline stage. A detailed disclosure of how the reset bits are generated may be found in U.S. patent application Ser. No. 08/451,495, entitled "Circuit For Designating Instruction Pointers For Use By A Processor Decoder" (Atty. Docket No. NSC1-64300) and U.S. patent patent application Ser. No. 08/445,563, entitled "Tagged Prefetch Instruction Decoder For Variable Length Instruction Set and Method of Operation" (Atty. Docket No. NSC1-64100), filed on even date herewith, both of which are incorporated herein by reference.

The following hypothetical example should help illustrate the operation of the prefetch stage of the microprocessor of the present invention. If we assume that bytes 4, 5 and 6 in prefetch buffer 0 are valid at the beginning of this cycle, then $PF0_{v(old)}$=01110000, and thus $\overline{PF0_{v(old)}}$=10001111

Further, let's assume that 2 bytes of data are being fetched from external memory on line 52 and that they are presented from latch 54 in byte positions 6 and 7. Accordingly,

MEM=11000000

Further, let's assume that byte positions 0 through 3 in prefetch buffer 1 contain valid data and byte positions 4 through 7 contain data tagged invalid. Accordingly, $PF1_{(old)}$=00001111

Finally, let's assume that the decode stage consumes bytes 4 and 5 from prefetch buffer 0 during this cycle.

Accordingly,

RESET=00110000, and thus $\overline{RESET}$=11001111

Given the above conditions, byte positions 4, 5 and 6 in prefetch buffer 0 should not be overwritten since they contain valid data. Therefore, the byte of instruction data in byte position 6 coming from memory cannot be loaded into prefetch buffer 0. However, the byte of instruction data in byte position 7 can be loaded into prefetch buffer 0 since the byte of data in byte position 7 of prefetch buffer 0 is invalid and can be overwritten. Finally, the four bytes of valid data in prefetch buffer 1 which are in byte positions 0 through 3 can all be written into prefetch buffer 0 since the corresponding bytes in prefetch buffer 0 are invalid.

Thus, the data output from multiplexer 56, as selected by select control lines 64, is determined by whether the memory has been returned within one clock cycle from the memory request. Since the data is being returned from external memory in this example, we know the data is not being returned in one cycle, thus, multiplexer 56 selects the data from transparent latch 54 rather than from the cache. Therefore, output 68 of multiplexer 56 has valid data in bit positions 6 and 7 and invalid data in bit positions 0 through 5. The clock enable signals 72 for prefetch buffer 1 are given by the MEM mask and the fact that there is an outstanding memory request. The MEM mask indicates that the valid data is in bit positions 6 and 7. Accordingly, $SETPF1 = MEM\ \&\ MEMREQ$ yields

| 11000000 | = | MEM |
|---|---|---|
|  | | & |
| 11111111 | = | MEMREQ |
| 11000000 | = | SETPF1 |

Thus, prefetch buffer 1 loads data into bit positions 6 and 7 from output 68 of multiplexer 56. Whether one or both of those bits will be marked valid will be determined momentarily.

Next, the data which is presented to prefetch buffer 0 through multiplexer 58 is dictated by the prefetch buffer 1 valid tag bits which are supplied as the select control signals 62 of multiplexer 58. Accordingly, since $PF1_{v(old)}$= 00001111, the data presented in byte positions 0 through 3 from the output of multiplexer 58 will be from prefetch buffer 1 and the data presented in byte positions 4 through 7 of the output of multiplexer 58 will be from output 68 of multiplexer 56 (i.e., from memory). The portion of the data presented to the input terminals of prefetch buffer 0 which actually will be loaded into prefetch buffer 0 is:

$$SETPF0 = (PF1_{v(old)} + MEM) \& \overline{PF0_{v(old)}}$$

which yields:

| 00001111 | = | $PF1_{v(old)}$ |
|---|---|---|
|  | | + |
| 11000000 | = | MEM |
| 11001111 | | |
|  | | & |
| 10001111 | = | $\overline{PF0_{v(old)}}$ |
| 10001111 | = | SEPTF0 |

Thus, prefetch buffer 0 loads bytes 0 through 3 (which are from prefetch buffer 1) and byte 7 (which is from external memory).

Next, the valid tag bits must be determined for prefetch buffers 0 and 1. The new condition of the valid tag bits for prefetch buffer 1 are given by:

$PF1_{v(new)}=(PF1_{v(old)} \& PF0_{v(old)} \& \overline{BRANCH\ NOT\ TAKEN})+ (MEM \& PF0_{v(old)} \& BRANCH\ NOT\ TAKEN)$ which yields;

```
00001111  =  PF1v(old)
                  &
01110000  =  PF0v(old)
                  &
11111111  =  BRANCH NOT TAKEN
00000000  =  →    →    →    00000000
11000000     MEM
                  &
01110000  =  PF0v(old)
                  &
11111111  =  BRANCH NOT TAKEN
01000000     →    →    →    01000000
                       PF1v(new) = 01000000
```

As can be seen, only byte 6 will be tagged valid in prefetch buffer 1. Particularly, bytes 0 through 3, which were previously valid, have been loaded into prefetch buffer 0. Bytes 4 and 5, which were previously invalid, must remain invalid since no new data has come in from memory in those byte positions. Valid data has come in from memory in byte position 6 and was not loaded into prefetch buffer 0. Accordingly, byte 6 is marked valid. Finally, although valid data was loaded from memory into prefetch buffer 1 in byte position 7, that data also was loaded into prefetch buffer 0 and will be marked valid there. Accordingly, it remains marked invalid in prefetch buffer 1.

The valid data in prefetch buffer 0 at the end of this cycle is given by:

$PF0_{v(new)}=(PF0_{v(old)}+SETPF0) \& \overline{RESET} \& \overline{BRANCH\ NOT\ TAKEN}$ which yields;

```
01110000  =  PF0v(old)
                  +
10001111  =  SETPF0
11111111
                  &
11001111  =  RESET
                  &
11111111  =  BRANCH NOT TAKEN
11001111  =  PF0v(new)
```

This result is correct since valid data has been loaded into bit positions 0 through 3 and 7 during this cycle, the valid data which previously existed in byte position 6 in prefetch buffer 0 remains and the valid data which previously existed in byte positions 4 and 5 has been consumed by the decode stage and not replaced during this cycle.

Figure 3:
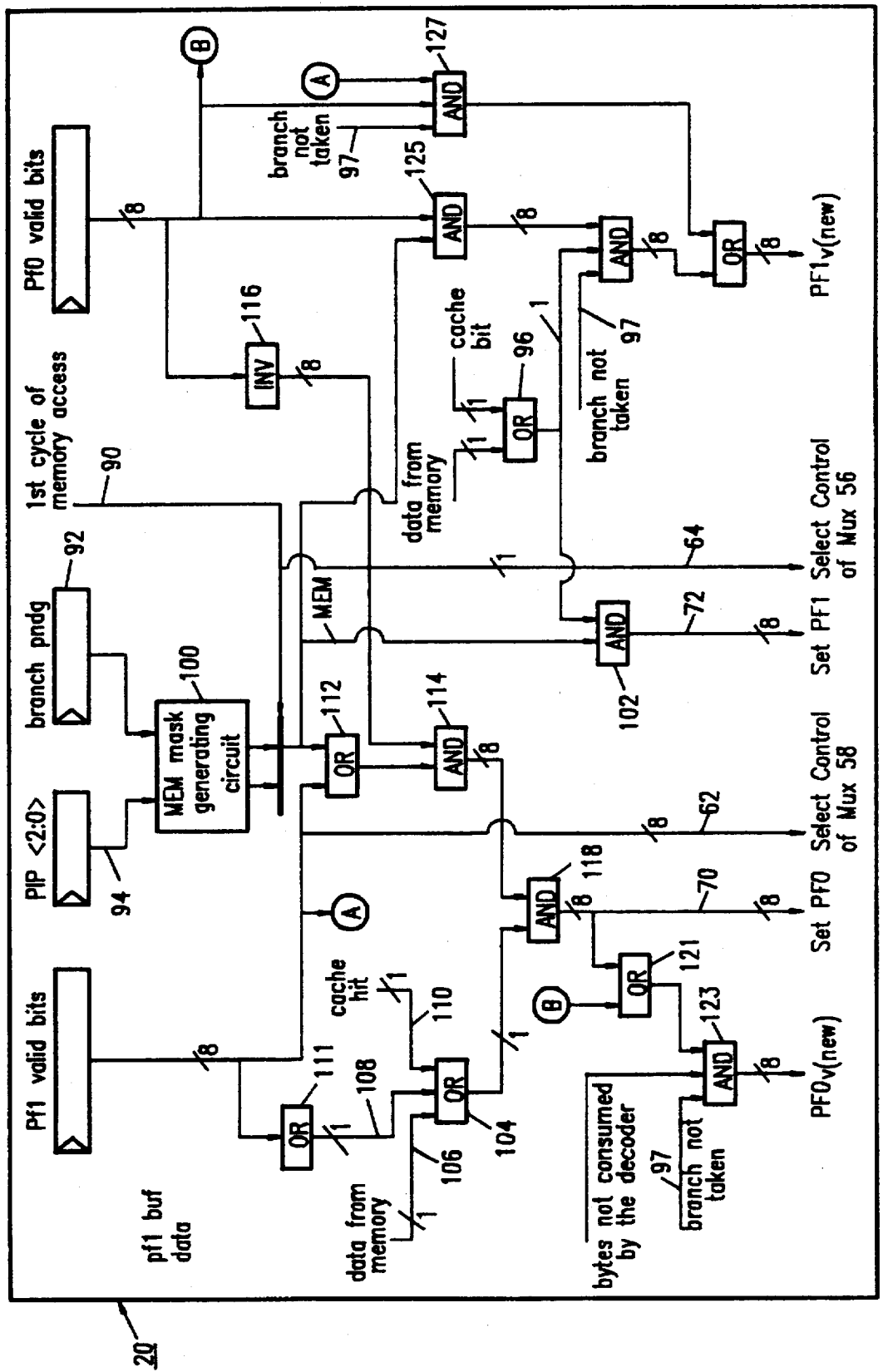
FIG. 3 is a block diagram illustrating exemplary logic for generating bit masks for selectively loading the prefetch buffers and valid tag bits for the prefetch buffers according to a preferred embodiment of the invention.

FIG. 3 shows the portion of the prefetch logic 20 of FIG. 1 which is used to generate the clock enable signals for the prefetch buffers, the select control lines for multiplexers 56 and 58, and the valid tag bits of prefetch buffers 0 and 1. The prefetch buffer 0 and prefetch buffer 1 valid tag bit conditions at the end of the preceding cycle as well as the first cycle of memory request signal are inputs to the logic. In a preferred embodiment of the invention, the valid tag bits are designated bits in their respective buffers. Thus, the prefetch buffers are physically 72 bits wide, having 8 bytes of instruction data and 1 bit of valid tags for each instruction byte. The first cycle of memory request signal 90 is generated outside of the prefetch stage for other purposes and is traced to the prefetch logic 20.

In order to determine what valid data is coming in from cache or external memory (i.e., the MEM mask), the lower three bits of the prefetch instruction pointer (PIP) 94 from the decode stage and a one bit branch pending signal 92 are also brought into the prefetch logic 20. The PIP points to the address of the first byte in memory from which data is being retrieved. Since the prefetch buffers are eight bytes wide, the lower three bits of the PIP address also are used to define the byte position in the buffer of the byte being accessed. MEM mask generating circuit 100 comprises a logic circuit for generating the MEM signal based on the PIP 94, the branch pending signal 92 and the first cycle of memory signal 90. Table 1 below shows the truth table for the output of MEM mask generating circuit 100 (i.e., MEM) as a function of the inputs. MEM mask generating circuit 100 can be implemented by any appropriate combinational logic circuit for implementing the indicated truth table.

TABLE 1

| Line | 1st Cycle | Branch Pending | PIP 2 | 1 | 0 | MEM | | | | | | | |
|------|-----------|----------------|---|---|---|---|---|---|---|---|---|---|---|
| 1  | 0 | 0 | 0 | 0 | 0 | 0 | 0 | 0 | 0 | 0 | 0 | 1 | 1 |
| 2  | 0 | 0 | 0 | 0 | 1 | 0 | 0 | 0 | 0 | 0 | 0 | 1 | 1 |
| 3  | 0 | 0 | 0 | 1 | 0 | 0 | 0 | 0 | 0 | 1 | 1 | 0 | 0 |
| 4  | 0 | 0 | 0 | 1 | 1 | 0 | 0 | 0 | 0 | 1 | 1 | 0 | 0 |
| 5  | 0 | 0 | 1 | 0 | 0 | 0 | 0 | 1 | 1 | 0 | 0 | 0 | 0 |
| 6  | 0 | 0 | 1 | 0 | 1 | 0 | 0 | 1 | 1 | 0 | 0 | 0 | 0 |
| 7  | 0 | 0 | 1 | 1 | 0 | 1 | 1 | 0 | 0 | 0 | 0 | 0 | 0 |
| 8  | 0 | 0 | 1 | 1 | 1 | 1 | 1 | 0 | 0 | 0 | 0 | 0 | 0 |
| 9  | 0 | 1 | 0 | 0 | 0 | 0 | 0 | 0 | 0 | 0 | 0 | 1 | 1 |
| 10 | 0 | 1 | 0 | 0 | 1 | 0 | 0 | 0 | 0 | 0 | 0 | 1 | 0 |
| 11 | 0 | 1 | 0 | 1 | 0 | 0 | 0 | 0 | 0 | 1 | 1 | 0 | 0 |
| 12 | 0 | 1 | 0 | 1 | 1 | 0 | 0 | 0 | 0 | 1 | 0 | 0 | 0 |
| 13 | 0 | 1 | 1 | 0 | 0 | 0 | 0 | 1 | 1 | 0 | 0 | 0 | 0 |
| 14 | 0 | 1 | 1 | 0 | 1 | 0 | 0 | 1 | 0 | 0 | 0 | 0 | 0 |
| 15 | 0 | 1 | 1 | 1 | 0 | 1 | 1 | 0 | 0 | 0 | 0 | 0 | 0 |

TABLE 1-continued

| Line | 1st Cycle | Branch Pending | PIP 2 | 1 | 0 | | | | MEM | | | |
|---|---|---|---|---|---|---|---|---|---|---|---|---|
| 16 | 0 | 1 | 1 | 1 | 1 | 1 | 0 | 0 | 0 | 0 | 0 | 0 |
| 17 | 1 | 0 | 0 | 0 | 0 | 1 | 1 | 1 | 1 | 1 | 1 | 1 |
| 18 | 1 | 0 | 0 | 0 | 1 | 1 | 1 | 1 | 1 | 1 | 1 | 1 |
| 19 | 1 | 0 | 0 | 1 | 0 | 1 | 1 | 1 | 1 | 1 | 1 | 1 |
| 20 | 1 | 0 | 0 | 1 | 1 | 1 | 1 | 1 | 1 | 1 | 1 | 1 |
| 21 | 1 | 0 | 1 | 0 | 0 | 1 | 1 | 1 | 1 | 1 | 1 | 1 |
| 22 | 1 | 0 | 1 | 0 | 1 | 1 | 1 | 1 | 1 | 1 | 1 | 1 |
| 23 | 1 | 0 | 1 | 1 | 0 | 1 | 1 | 1 | 1 | 1 | 1 | 1 |
| 24 | 1 | 0 | 1 | 1 | 1 | 1 | 1 | 1 | 1 | 1 | 1 | 1 |
| 25 | 1 | 1 | 0 | 0 | 0 | 1 | 1 | 1 | 1 | 1 | 1 | 1 |
| 26 | 1 | 1 | 0 | 0 | 1 | 1 | 1 | 1 | 1 | 1 | 1 | 0 |
| 27 | 1 | 1 | 0 | 1 | 0 | 1 | 1 | 1 | 1 | 1 | 0 | 0 |
| 28 | 1 | 1 | 0 | 1 | 1 | 1 | 1 | 1 | 1 | 0 | 0 | 0 |
| 29 | 1 | 1 | 1 | 0 | 0 | 1 | 1 | 1 | 0 | 0 | 0 | 0 |
| 30 | 1 | 1 | 1 | 0 | 1 | 1 | 1 | 0 | 0 | 0 | 0 | 0 |
| 31 | 1 | 1 | 1 | 1 | 0 | 1 | 1 | 0 | 0 | 0 | 0 | 0 |
| 32 | 1 | 1 | 1 | 1 | 1 | 1 | 0 | 0 | 0 | 0 | 0 | 0 |

The table is relatively self-explanatory. The first 16 rows relate to accesses from external memory since the data is not returned in the first cycle. In the first 8 rows, no branch is pending and the three LSBs of the PIP indicate the position in the 8 byte wide input of the 2 bytes of data being returned from external memory.

When a branch is pending, however, not all returned data from memory may be part of the valid instruction stream. Particularly, in the illustrated embodiment external memory has a line width of 2 bytes and cache memory has a line width of 8 bytes. Accordingly, data is retrieved only in these two widths, respectively. A branch, however, may be to any byte in memory and particularly can be to a byte in the middle of a memory line. Accordingly, if a branch is to the second byte in a memory line, both bytes at the specified line address in external memory (or all 8 bytes, if it happens to be a cache hit) are returned to the prefetch stage. The first byte of the returned line .must be marked invalid in the prefetch stage so that it is not decoded and executed.

Rows 9–16 illustrate the situations for a cache miss when a branch is pending.

Rows 17 through 24 cover the cases where memory is returned in a first cycle (therefore it is from the cache) and a branch is not pending. In all of those situations, all 8 bytes are valid. Rows 25–32 illustrate the situation if there is a cache hit and a branch is pending. As can be seen from the table, as the lower three bytes of the PIP increases, the destination byte of the branch is further to the left in the line, meaning that more and more bytes at the right of the line must be tagged invalid.

The MEM lines output from MEM mask generating circuit 100 are the clock enable signals for prefetch buffer 1 (SETPF1), assuming that there is a memory hit. In order to assure that the MEM value is used only when there is a memory hit, the MEM lines are ANDed by AND gate 102 with the single bit output of OR gate 96. OR gate 96 simply receives two 1 bit inputs indicating whether data is being returned from external memory or from the cache, respectively. This line is the MEMREQ signal in the equations above.

The select control lines 62 to multiplexer 58 are the prefetch buffer 1 valid tag bits. Therefore, the prefetch buffer 1 valid tag bits are supplied as the select control input signals of multiplexer 58 without passing through any combinational logic.

The clock enable signal 70 for prefetch buffer 0 (SETPF0) is generated by ORing the MEM signal with the prefetch buffer 1 valid tag bits in OR gate 112 and ANDing that result in AND gate 114 with the inverse of the prefetch buffer 0 valid tag bits, as inverted by inverter 116. That result is ANDed by an AND gate 118 with the 1 bit output of OR gate 104. The output of Or-gate 104 prevents prefetch buffer 0 from attempting to load any data when there is no possible data to be loaded. Particularly, Or-gate 104 ORs together signals 106 108 and 110. Signal 106 indicates if data is available from external memory during the current cycle. Signal 110 indicated whether there is a cache hit during the current cycle. Signal 108 is output from OR-gate 111, which ORs together the eight valid tags of prefetch buffer 1 to generate a single bit signal which indicates whether prefetch buffer 1 has any valid bytes. If it does not, then no data can be loaded into prefetch buffer 0 from prefetch buffer 1 in any event.

Finally, the select control lines 64 into multiplexer 56 comprises the first cycle of memory request signal itself, without passage through any combinational logic. This one bit signal is simply fanned out to the eight select control terminals of multiplexer 56.

After the appropriate data bytes have been loaded into the prefetch buffers 0 and 1, the valid tag bits of the two buffers must be updated. In accordance with the equations discussed above, the valid tag bits for prefetch buffer 0 are updated by ORing SETPF0 with the current condition of the prefetch buffer 0 valid tag bits in OR gate 121 and ANDing that result with the inverse of the RESET bits in AND gate 123. AND gate 123 also ANDs in a third signal indicating that a branch has not been taken in the execute stage. If a branch is taken in the execute stage during this cycle, then the pipeline must be flushed and the data in the prefetch stage will be thrown out. As such, the valid tag bits should all be reset to invalid (i.e., 0).

The circuitry for generating the valid tag bits for prefetch buffer 1 appears primarily on the right hand side of FIG. 3. In accordance with the equation previously set forth, the prefetch buffer 0 valid tag bits from the previous cycle are ANDed with MEM by AND gate 125. They are also ANDed with the current prefetch buffer 1 valid tag bits by AND gate 127. For the same masons discussed above with respect to generation of the prefetch buffer 0 valid tag bits, AND gate 127 has a third input coupled to receive the branch not taken signal. The output of AND gate 125 is further ANDed with the output of OR gate 96 and the branch not taken signal 97 to assure that (1) the signals on MEM are not used to affect the prefetch buffer 1 valid tag bits if there is no memory hit during this cycle and (2) the prefetch buffer 1 valid tag bits are all reset if a branch is taken in the execute stage.

Figure 4:
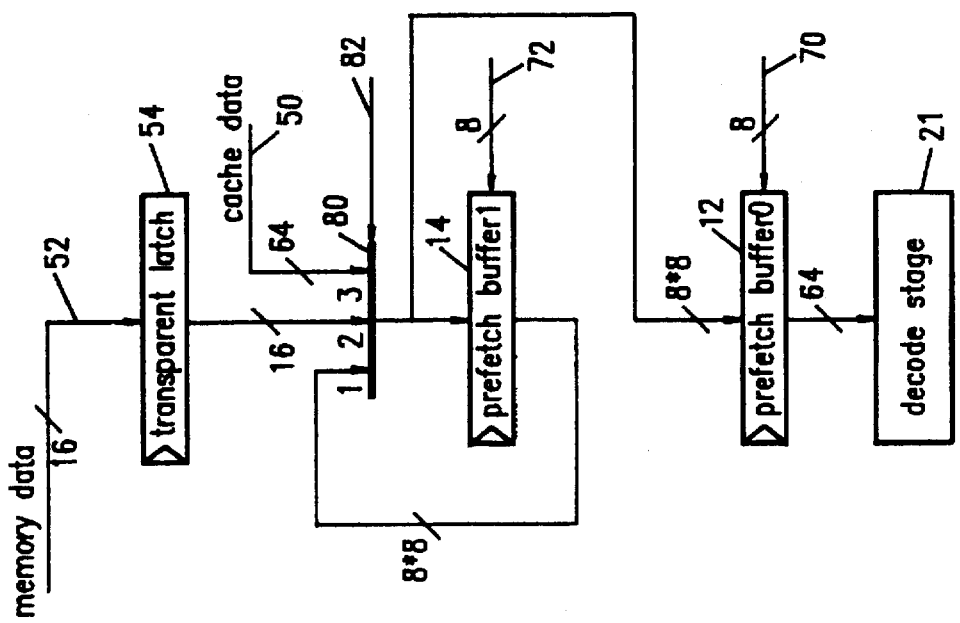
FIG. 4 is a block diagram of an actual preferred implementation of a prefetch stage of a microprocessor according to a preferred embodiment of the present invention.

FIG. 4 illustrates a preferred actual circuit implementation which performs the function described by FIGS. 2 and 3. The circuit essentially is the same as shown in FIG. 2 except that 2 to 1 multiplexers 56 and 58 are replaced by a single 3:1 multiplexer 80. The clock enables to prefetch buffers 0 and 1 remain the same as previously disclosed. The select control signal 82 into 3:1 multiplexer 80 is given by:

$$SELECT1 = \overline{PF1_{x(old)}}$$

$$SELECT2 = PF1_{(old)} \& \overline{1^{st}CYCLE}$$

$$SELECT3 = PF1_{x(old)} \& 1^{st}CYCLE$$

where

SELECT 1 selects the corresponding byte at input number 1,

SELECT 2 selects the corresponding byte at input number 2,

SELECT 3 selects the corresponding byte at input number 3, and

First cycle=data is being return within one cycle of the memory request.

Many different circuit implementations for generating select control signals 82 for multiplexer 80 in accordance with this equation would be obvious to a person of ordinary skill in the related arts and are therefore not specifically discussed herein.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,076, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, entitled "EXECUTION UNIT ARCHITECTURE TO SUPPORT ×86 INSTRUCTION SET AND ×86 SEGMENTED ADDRESSING" (atty. docket no. NSC1-63300); U.S. patent application Ser. No. 08/451,444, entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. patent application Ser. No. 08/451,535, now U.S. Pat. No. 5,617,543, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,153 (now U.S. Pat. No. 5,546,353 issued Aug. 13, 1996), entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, now U.S. Pat. No. 5,598,112, entitled "CIRCUIT FOR GENERATING A DEMAND-BASED GATED CLOCK" (atty. docket no. NSC1-64500); U.S. patent application Ser. No. 08/451,214, now U.S. Pat. No. 5,583,453, entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080 entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, Now U.S. Pat. No. 5,612,637 entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, entitled "SUPPLY AND INTERFACE CONFIGURABLE INPUT/

OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. patent application Ser. No. 08/450,726, entitled "INTEGRATED CIRCUIT WITH TEST SIGNAL BUSES AND TEST CONTROL CIRCUITS" (atty. docket no. NSC1-67600); U.S. patent application Ser. No. 08/445,568, entitled "DECODE BLOCK TEST METHOD AND APPARATUS" (atty. docket no. NSC1-68000).

Having thus described a few particular embodiments of the invention, various alterations, modifications and improvements will readily occur to those skilled in the art. Such alterations, modifications, and improvements as are made obvious by this disclosure are intended to be part of this description though not expressly stated herein, and are intended to be within the spirit and scope of the present invention. Accordingly, the foregoing description is by way of example only and not limiting. The invention is limited only as defined in the following claims and equivalents thereto.

What is claimed is:

1. A pipelined processor architecture having at least a prefetch stage and a decode stage, said prefetch stage comprising;
    a first buffer for simultaneously storing a plurality of instruction segments, said first buffer having a data input terminal coupled to receive a plurality of instruction segments retrieved simultaneously from a memory and a data output terminal coupled to said decode stage of said processor,
    a second buffer for simultaneously storing a plurality of instruction segments, said second buffer having a data input terminal coupled to receive a plurality of instruction segments retrieved simultaneously from said memory and having a data output terminal coupled to said data input terminal of said first buffer, and
    control means for causing said first buffer to store a subset of said instruction segments retrieved simultaneously from said memory for which said first buffer has space which is not occupied by other instruction segments to be decoded, and for causing said second buffer to load any remaining instruction segments retrieved simultaneously from said memory.

2. A processor as set forth in claim 1 wherein said buffers each comprise a plurality of segment storage positions, and said prefetch stage further comprises tag storage means for storing tag bits comprising a tag bit for each segment storage position in said first and second buffers indicating whether the corresponding segment storage position holds a valid instruction segment to be decoded.

3. A processor as set forth in claim 2 wherein said tag storage means comprises storage locations within said buffers.

4. A processor as set forth in claim 2 wherein said tag bit values are set as a function of the segment storage position of instruction segments which are consumed by the decode stage and the segment storage position of instruction segments retrieved from said memory.

5. A processor as set forth in claim 2 wherein said processor has a variable width instruction set and said buffers are of equal width, said width being less than a maximum possible instruction width of an instruction and greater than the width of most instructions in said variable width instruction set.

6. A processor as set forth in claim 5 wherein said buffer width is eight segments wide.

7. A processor as set forth in claim 5 wherein said memory comprises an instruction cache having a line width equal to said buffer width.

8. A processor as set forth in claim 5 wherein said control means further loads a subset of said instruction segments in said second buffer into said first buffer when corresponding portions of said first buffer become available in said first buffer for said segments simultaneous with the loading into said first buffer of instruction segments from said memory.

9. A processor as set forth in claim 8 wherein segments are loaded into said buffers in a segment position determined by an address of the segment such that, for each segment, there is only one segment position in each buffer into which it can be loaded, said processor further comprising;
    means for generating a memory mask indicating the segment position of instruction segments retrieved from memory, and
    means for generating a reset mask indicating the segment position from which said first buffer instruction segments were consumed by said decode stage, and
    wherein said control means causes instruction segments to be loaded into said buffers responsive to said memory mask, said reset mask, said valid tag bits of said first buffer and said valid tag bits of said second buffer.

10. A processor as set forth in claim 9 wherein said subset of instruction segments from memory and said subset of instruction segments from said second buffer are loaded into said first buffer as a function of said valid tag bits of said first and second buffers and said memory mask, and wherein said subset of instruction segments from memory are loaded into said second buffer as a function of said memory mask.

11. A processor as set forth in claim 10 wherein said valid tag bits for said segment positions in said first buffer are generated as a function of said reset mask, a previous condition of said valid tag bits of said first and second buffers and said memory mask, and wherein said valid tag bits for said segment positions in said second buffer are generated as a function of a previous condition of said valid tag bits for said first and second buffers and said memory mask.

12. A processor as set forth in claim 11 wherein said control means comprises at least a first multiplexer having a first input coupled to said memory, and a second input coupled to said output terminal of said second buffer, an output coupled to said first and second buffers, and wherein said control means further comprises means for generating a select control signal for said multiplexer and clock enable signals for said first and second buffers.

13. A processor as set forth in claim 12 wherein said buffers each further comprise a clock enable terminal for each segment position in said buffers and said multiplexer is the same width as said buffers and has a select control input terminal in which each segment position of said multiplexer is individually selectable.

14. A processor as set forth in claim 13 wherein said control means further comprises circuitry for logically combining said reset and memory masks with said valid tag bits to generate select control signals for controlling said multiplexer and said clock enable signals for each of said first and second buffers.

15. A processor as set forth in claim 14 wherein said processor has an ×86 type architecture and wherein said buffers and said multiplexer are eight segments wide.

16. A processor as set forth in claim 15 wherein said memory further comprises an external memory for storing said instruction segments, and wherein said cache memory stores copies of certain of said instruction segments from said external memory, and further comprising:

means for loading the instruction segments stored in said second buffer to a line in said cache memory when said second buffer contains a full line of instruction segments retrieved from said external memory.

17. A processor as set forth in claim 16 wherein said cache memory and said first and second buffers have equal line widths.

18. A method of retrieving instruction segments in a pipelined processor and presenting said instruction segments for decoding, said method comprising the steps of;

retrieving a plurality of instruction segments from a memory simultaneously, storing in a first buffer a subset of said instruction segments retrieved from memory for which said first buffer has space not occupied by other instruction segments to be decoded, storing in a second buffer those instruction segments retrieved from memory for which space is not available in said first buffer, and retrieving instructions from said first buffer for decoding.

19. A method as set forth in claim 18 wherein said buffers each comprise at least one segment storage position and further comprising the step of;

generating and storing a tag bit corresponding to each segment storage position in said first and second buffers indicating whether the corresponding segment storage position holds an instruction segment to be decoded.

20. A method as set forth in claim 19 wherein said processor operates in cycles and said step of generating and storing tag bits comprises setting values for said tag bits as a function of instruction segments decoded and segments retrieved from said memory each cycle of said processor.

21. A method as set forth in claim 20 wherein said first and second buffers comprise an equal number of segment positions, and wherein segments are loaded into said buffers in a segment position determined by an address of the segment such that, for each segment, there is only one segment position in each buffer into which it can be loaded, said method further comprising the step of;

loading instruction segments from said second buffer into said first buffer when space becomes available in said first buffer for said segments.

22. A method as set forth in claim 21 further comprising the steps of;

generating a memory mask indicating the segment positions of instruction segments retrieved from memory, generating a reset mask corresponding to instruction segments consumed from said first buffer by said decode stage, and wherein said buffers are loaded with instruction segments responsive to said memory mask, said reset mask, said valid tag bits of said first buffer and said valid tag bits of said second buffer.

23. A method as set forth in claim 22 wherein said step of storing segments in said first buffer comprises the steps of;

observing said valid tag bits for said first buffer to determine the segment positions in said first buffer which are tagged invalid and are thus available to accept segments, observing said valid tag bits for said second buffer to determine the segment positions in said second buffer which are tagged invalid and are thus available to accept segments, loading those valid tagged segments in segment positions in said second buffer and for which the corresponding segment position in said first buffer are tagged invalid into said corresponding segment positions in said first buffer, observing said memory mask to determine the segment position in said buffers to which segments retrieved from memory correspond, and loading into said first buffer those segments retrieved from memory corresponding to segment positions in both said first and second buffers which are tagged invalid.

24. A method as set forth in claim 23 wherein said step of storing segments in said second buffer comprises the steps of;

observing said memory mask to determine the segment positions in said second buffer to which segments retrieved from memory correspond, and loading said segments retrieved from memory into said corresponding segment positions in said second buffer.

25. A method as set forth in claim 24 wherein said step of generating and storing tag bits for said first buffer comprises the steps of;

observing said reset mask to determine from which segment positions in said first buffer segments have been decoded, resetting said tag bits corresponding to segment positions in said first buffer from which segments have been decoded, and setting said tag bits corresponding to those segment positions which have been loaded with segments from memory or said second buffer.

26. A method as set forth in claim 25 wherein said step of generating and storing tag bits for said second buffer comprises the steps of;

observing said memory mask, observing said tag bits for said first buffer, observing said tag bits for said second buffer, and setting as valid the tag bits for said second buffer corresponding to those segment positions (1) which were tagged valid in both said first and second buffers and (2) which were both tagged valid in said first buffer and to which segments retrieved from memory correspond.

27. A pipelined processor architecture having at least a prefetch stage and a decode stage, said prefetch stage comprising;

an X segment wide multiplexer, where X is an integer, having a first data input terminal coupled to receive a plurality of instruction segments retrieved simultaneously from a memory, a second input terminal, an output terminal, and a select control input terminal including a separate control for each segment in the width of said multiplexer, an X segment wide first buffer having X segment positions for storing a plurality of instruction segments, said first buffer having a data input terminal coupled to said output terminal of said multiplexer, a data output terminal coupled to said decode stage of said processor, and a clock enable input terminal including a separate enable terminal for each segment position of said buffer, an X segment wide second buffer having X segment positions for storing a plurality of instruction segments, said second buffer having a data input terminal coupled to said output terminal of said multiplexer, a data output terminal coupled to said second input terminal of said multiplexer, and a clock enable input terminal including a separate enable terminal for each segment position of said buffer, wherein segments are loaded into said buffers in a segment position determined by an address of the segment such that, for each segment, there is only one segment position in each buffer into which it can be loaded, storage means for storing a tag bit corresponding to each segment position in each of said first and second buffers and indicating whether the data in the corresponding segment position is a valid instruction segment to be decoded, and control means for simultaneously loading into segment positions in said first buffer (1) a first subset of said instruction segments in said second buffer in segment positions which are tagged valid in said second buffer and for which the corresponding segment position in said first buffer is tagged invalid and (2) a second subset of said instruction segments retrieved simultaneously from memory corresponding to segment positions which are tagged invalid in both said first and second buffers, said control means loading instruction segments retrieved from memory which are not loaded into said first buffer into said corresponding segment positions in said second buffer.

28. A processor as set forth in claim 27 wherein said prefetch stage further comprises:

means for generating said tag bits for said first buffer in which (1) tag bits corresponding to segment positions in said first buffer which have been loaded with segments from memory, (2) tag bits corresponding to segment positions which have been loaded with segments from said second buffer and (3) tag bits corresponding to segment positions which were previously tagged valid and were not consumed by the decode stage are marked valid, while all other tag bits are tagged invalid.

29. A processor as set forth in claim 28 wherein said prefetch stage further comprises means for generating tag bits for said second buffer in which segment positions corresponding to segments retrieved from memory which were not loaded into said first buffer as well as any previously valid tagged segment positions in said second buffer which were not loaded into said first buffer are tagged valid, while all other segment position in said second buffer are tagged invalid.

30. A processor as set forth in claim 4 wherein segments are loaded into said buffers in segment positions determined by an address of the segment such that, for each segment, there is only one segment position in each buffer into which it can be loaded, and wherein said valid tag bit values are set in accordance with;

$$PFO_{v(new)} = (PFO_{v(old)} + SETPFO) \text{ \& } \overline{RESET} \text{ \& and BRANCH NOT TAKEN}$$

$$PF1_{v(new)} = (PF1_{v(old)} \text{ \& } \overline{PFO_{v(old)}} \text{ \& } BRANCH \text{ } NOT \text{ } TAKEN) + (MEM \text{ \& } \overline{PFO_{v(old)}} \text{ \& } \overline{BRANCH NOT TAKEN})$$

where $PFO_{v(new)}$=the condition of the tag bits for said first buffer, $PF1_{v(new)}$=the condition of the tag bits for said second buffer, $PFO_{v(old)}$=the previous condition of the tag bits for said first buffer, $PF1_{v(old)}$=the previous condition of the tag bits for said second buffer, BRANCH NOT TAKEN=a signal indicating that the processor has not taken a branch, RESET=a mask indicating the segments in said first buffer were consumed by the decoder during the cycle, and MEM=a mask indicating segment positions of instruction segments retrieved from memory.

31. A processor as set forth in claim 9 wherein said instruction segments are loaded into said buffers in accordance with;

$$SETPF1 = MEM \text{ \& } \overline{MEMREQ}$$

$$SETPFO = (PF1_{v(old)} + MEM) \text{ \& } \overline{PFO_{v(old)}}$$

where

MEM=said memory mask, and

MEMREQ=a signal indicating if a memory request is pending.

* * * * *

UNITED STATES PATENT AND TRADEMARK OFFICE
CERTIFICATE OF CORRECTION

PATENT NO.   : 5,680,564
DATED        : October 21, 1997
INVENTOR(S)  : Robert J. Divivier, et. al.

It is certified that error appears in the above-identified patent and that said Letters Patent is hereby corrected as shown below:

In Col. 20, line 10, begin a new paragraph with the word "loading";
In Col. 22, line 15, move "and" to the left margin;
In Col. 22, line 15, begin a new paragraph with the word "BRANCH"; and
In Col. 22, line 18, insert a space between "BRANCH" and "NOT".

Signed and Sealed this

Sixteenth Day of December, 1997

Attest:

BRUCE LEHMAN

*Attesting Officer*   *Commissioner of Patents and Trademarks*